(12) United States Patent
Birkeland et al.

(10) Patent No.: US 12,121,985 B2
(45) Date of Patent: Oct. 22, 2024

(54) ENHANCED METHOD FOR CUTTING PIPES ON A DRILL FLOOR AND TOOL THEREFOR

(71) Applicant: Control Cutter AS, Tananger (NO)

(72) Inventors: Petter Birkeland, Tananger (NO); Bård Mjølne, Ålgård (NO); Kjetil Sirevåg, Sandnes (NO)

(73) Assignee: Control Cutter AS, Tananger (NO)

(*) Notice: Subject to any disclaimer, the term of this patent is extended or adjusted under 35 U.S.C. 154(b) by 390 days.

(21) Appl. No.: 17/442,267

(22) PCT Filed: Mar. 2, 2020

(86) PCT No.: PCT/NO2020/050054
§ 371 (c)(1),
(2) Date: Sep. 23, 2021

(87) PCT Pub. No.: WO2020/197401
PCT Pub. Date: Oct. 1, 2020

(65) Prior Publication Data
US 2022/0250178 A1    Aug. 11, 2022

(30) Foreign Application Priority Data
Mar. 27, 2019  (NO) ................................. 20190418

(51) Int. Cl.
*B23D 21/00* (2006.01)
*B23D 15/04* (2006.01)
(Continued)

(52) U.S. Cl.
CPC ........... *B23D 21/006* (2013.01); *B23D 15/04* (2013.01); *B23D 15/14* (2013.01); *E21B 29/002* (2013.01)

(58) Field of Classification Search
CPC ........ B23D 15/04; B23D 15/14; B23D 15/00; E21B 29/00; E21B 29/002
(Continued)

(56) References Cited

U.S. PATENT DOCUMENTS 1,161,705 A * 11/1915 Lloyd ................. B23D 45/003
83/636
4,923,005 A    5/1990 Laky et al.
(Continued)

FOREIGN PATENT DOCUMENTS

JP         60238218 A  * 11/1985
KR     2013131880 A  * 12/2013
(Continued)

OTHER PUBLICATIONS

KR-2013131880-A, Translation (Year: 2023).*
(Continued)

*Primary Examiner* — Nhat Chieu Q Do
(74) *Attorney, Agent, or Firm* — Andrus Intellectual Property Law, LLP (57) ABSTRACT

A method is for cutting a tubular structure in the petrochemical industry, using a cutting tool having a non-rotatable cutting element and a reaction member opposite to the non-rotatable cutting element. The cutting tool is further configured for carrying out a translational cutting movement through the tubular structure. The method comprises: a) positioning the cutting tool in a first position exterior to the tubular structure; b) squeezing the tubular structure at the first position by activating a partial translational cutting movement of the non-rotatable cutting element to obtain a dented region in the tubular structure; c) positioning the cutting tool in a second position exterior to the tubular structure, wherein the second position is displaced over a predefined distance compared to the first position, and d)
(Continued)

cutting the tubular structure at the second position (P2) by activating a full translational cutting movement of the non-rotatable cutting element through the tubular structure.

15 Claims, 8 Drawing Sheets

(51) Int. Cl.
  *B23D 15/14* (2006.01)
  *E21B 29/00* (2006.01)
(58) Field of Classification Search
  USPC .............................................................. 83/54
  See application file for complete search history.

(56) References Cited

U.S. PATENT DOCUMENTS

| | | | |
|---|---|---|---|
| 5,400,857 A | * | 3/1995 | Whitby ................... E21B 29/08 |
| | | | 251/1.3 |
| 7,243,646 B2 | | 7/2007 | Todack |
| 7,351,010 B1 | | 4/2008 | Kelly et al. |
| 7,832,480 B1 | | 11/2010 | Fanguy |
| 2005/0194000 A1 | | 9/2005 | Todack |
| 2007/0033812 A1 | * | 2/2007 | Kimura ................ B23D 21/006 |
| | | | 30/173 |
| 2009/0277637 A1 | | 11/2009 | Mire |
| 2012/0291606 A1 | | 11/2012 | Khoury et al. |
| 2013/0220436 A1 | * | 8/2013 | Sharp ................... B23D 21/006 |
| | | | 137/15.01 |
| 2018/0058170 A1 | | 3/2018 | Anderson |

FOREIGN PATENT DOCUMENTS

| | | | | |
|---|---|---|---|---|
| WO | WO-2015197528 A1 | * | 12/2015 | .......... B23D 21/006 |
| WO | 2017099607 | | 6/2017 | |
| WO | 2019108066 | | 6/2019 | |
| WO | WO-2019108066 A1 | * | 6/2019 | ............. B23D 15/04 |

OTHER PUBLICATIONS

WO 2015/197528, Translation (Year: 2024).*
Norwegian Search Report for NO 20190418, dated Oct. 18, 2019.
International Search Report and the Written Opinion for PCT/NO2020/050054, dated Jun. 15, 2020.

* cited by examiner

ENHANCED METHOD FOR CUTTING PIPES ON A DRILL FLOOR AND TOOL THEREFOR

CROSS-REFERENCE TO RELATED APPLICATIONS

This application is the U.S. national stage application of International Application PCT/NO2020/050054, filed Mar. 2, 2020, which international application was published on Oct. 1, 2020, as International Publication WO 2020/197401 in the English language. The International Application claims priority of Norwegian patent application Ser. No. 20/190,418, filed Mar. 27, 2019. The international application and Norwegian application are both incorporated herein by reference, in entirety.

FIELD OF THE INVENTION

The invention relates to a method for cutting a tubular structure in the petrochemical industry using a cutting tool. The invention further relates to the cutting tool used in such method.

BACKGROUND OF THE INVENTION

In drilling operations, such as operations on an oilrig, there is sometimes a need to cut tubular structures, such as casings, drill strings, production tubings and risers. Different techniques for cutting tubular structures have been developed. One of the most common ways to cut tubular structures at the drill floor is abrasive cutting from within the tubular structure, diamond wire cutting or a mechanical saw cutting. Typically, the tubular structure is cut in small sections, which are then taken away from the drill floor. Typical cutting time for a 30-inch casing is in the order of a few hours. The problem with above cutting techniques is that they take too much time. Thus, there is a need for faster cutting techniques of which several have been disclosed over time.

Recently the current inventor invented a new method and tool for cutting tubular structures at a drill floor, wherein translational cutting technology that had been developed before for subsea applications as known from WO2017/099607A1, was effectively reused at the drill floor of a drill rig (the cutting tool was redesigned to fit that purpose). It was the inventor who realized that such translational cutting may also be carried out at the drill floor, leading to an enormous time gain with cutting times down to 5 minutes as experiments had shown. This in contrast with the earlier described abrasive cutting techniques, which can easily take up to 2 hours. Translational cutting is particularly beneficial in case of long tubular structures that need to be severed piece by piece.

However, as this technology was being tested it was discovered that in the case of multiple tubular structures comprising multiple pipes inside, the inner pipes may fall out during lifting of the cut parts of the tubular structure. Hence, so-called pinning technology was required, wherein a metal pin was applied through the tubular structure in order to keep the inner pipes in place during lifting. The inventor discovered that pinning was also required for the cutting method as disclosed in WO2017/099607A1, contrary to what is mentioned in that document.

The problem with pinning (applying pins through tubular structures) is that this also requires a lot of time, thus effectively reducing the time gain that was achieved with the translational cutting of the tubular structure.

Therefore there was a need to further develop the cutting technology in order to be able to severe tubular structures faster.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a method for cutting a tubular structure in the petrochemical industry, using a cutting tool having a non-rotatable cutting element and a reaction member opposite to the non-rotatable cutting element, the cutting tool being configured for carrying out a translational cutting movement through the tubular structure, wherein the method comprises the following steps:
a) positioning the cutting tool in a first position exterior to the tubular structure;
b) squeezing the tubular structure at the first position by activating a partial translational cutting movement of the non-rotatable cutting element to obtain a dented region in the tubular structure;
c) positioning the cutting tool in a second position exterior to the tubular structure, wherein the second position is displaced over a predefined distance compared to the first position yet still near the dented region, and
d) cutting the tubular structure at the second position by activating a full translational cutting movement of the non-rotatable cutting element through the tubular structure.

The effects of method in accordance with the invention are as follows. During the cutting of a tubular structure the tubular structure typically deforms forming a dented region having shoulders. The method of the invention exploits this effect by not cutting completely at a first location but leaving the tubular structure substantially intact, thus forming the dented region by carrying out a partial translational cutting movement of the cutting tool, i.e. not over its complete swing. Effectively this implies that in the first step the tubular is squeezed and not cut at the first location. Subsequently the cutting tool is positioned at a second position displaced over a predefined distance from the first position. At this second position a full translational cutting movement is carried out with the cutting tool, thereby severing the tubular structure. The effect of this method is that the tubular structure may be subsequently lifted without the inner pipes of the tubular structure necessarily dropping out of the outer pipe. Additionally, the dented region may be conveniently handled by a device, which is also called a slips device. Such slips device may be configured and shaped for enclosing the dented region such that it may be lifted by a hoisting system (an elevator or a crane).

In order to facilitate understanding of the invention one or more expressions are further defined hereinafter.

Wherever the wording "drill floor" is used, this is interpreted to be the heart of any drilling rig (such as an oil rig, but the drill floor may also be on a boat or other floating vessel), i.e. the area where the drill string begins its trip into the earth. It is traditionally where joints of pipes are assembled, as well as the BHA (bottom hole assembly), drilling bit(s), and various other tools. This is the primary work location for roughnecks and the driller. The drill floor is located directly under the derrick or drill tower. The floor is typically a relatively small work area in which the rig crew conducts operations, usually adding or removing drill pipes to or from the drill string. The rig floor is the most dangerous location on the rig because heavy iron is moved around there. Drill string connections are made or broken on the drill floor, and the driller's console for controlling the major components of the rig are located there. It must be stressed, however, that the invention is not limited to the use on drill floors only, but virtually any place in the petrochemical industry. It may also be used on vessels, cellar decks or even at the sea floor.

In an embodiment of the method in accordance with the invention, in operational use of the method, the tubular structure is oriented in an upright position, and wherein the second position is located above the first position. In this sequence of steps a method is obtained wherein an existing casing structure may be easily severed as these steps are being repeated. The casing may then be removed piece by piece, wherein after carrying out the cut, the casing is lifted with a hoisting system using a slips device that grips around the dented region. After lifting the casing over a certain length, the steps of squeezing and subsequently cutting above the formed dented region, may be repeated.

In an embodiment of the method in accordance with the invention the cutting tool is moved to and from the tubular structure by means of a crane or manipulator. The cutting tool in this embodiment of the method is conveniently manipulated by means of a crane or manipulator, wherein the cutting tool is hung or mounted. It is brought to the tubular structure, which for instance resides at a drill floor, when it is needed and taken away when no longer needed.

In an embodiment of the method in accordance with the invention the cutting tool is moved to and from the tubular structure by means of a rail system. The cutting tool in this embodiment of the method is conveniently manipulated by means of a rail system, i.e. the cutting tool is rolled towards the tubular structure, which for instance resides at a drill floor, when it is needed and rolled away when no longer needed.

In an embodiment of the method in accordance with the invention the tubular structure in the petrochemical industry to be cut is one of the group consisting of: a conductor, a casing, a lined casing, a cemented casing, a cemented lined casing, a drill string, a drill pipe, a production tubing, and a riser. These tubular structures are the most conventional types that may need to be cut in the petrochemical industry. In addition to cutting these types of tubular structures, the invention even facilitates rapid cutting of a casing with a tubing inside with cement in between. Alternatively, the invention facilitates cutting a riser with multiple internal casings and a tubing with cement in between in the different tubular structures.

In an embodiment of the method in accordance with the invention a cutting tool is used which comprises: i) a tool body configured for receiving the tubular structure in an enclosure thereof; ii) an actuator mounted on the tool body at one side of the enclosure; iii) a non-rotatable cutting element provided on the actuator, the actuator with the cutting element being configured for carrying out a translational cutting movement through the enclosure including the tubular structure, and iv) a reaction member mounted at an opposite side of the enclosure of the tool body opposite to the cutting element for applying a reaction force on the tubular structure during cutting. Furthermore in this embodiment of the method, in the steps of positioning, the tubular structure is received within the enclosure. The cutting tool that is used in this embodiment of the method is similar to the cutting tool from WO2017/099607A1 (but not exactly the same) and is conveniently used for the purpose of the current invention. It must be stressed that the cutting tool from WO2017/099607A1 could be used for the method of the invention. However, it must be stressed that the current invention also relates to further improvements of this cutting tool which are claimed in the device claims.

In an embodiment of the method in accordance with the invention a cutting tool is used, wherein the reaction member is provided with a further cutting element directed towards the non-rotatable cutting element for facilitating the cutting. Providing a cutting tool with a further cutting element on the reaction member further speeds up the cutting speed.

In a second aspect the invention relates to a method of handling a tubular structure comprising the method according to the invention, further comprising the step of gripping the dented region of the tubular structure with a slips device configured for gripping in between shoulders of the dented region.

An embodiment of the method of handling a tubular structure in accordance with the invention further comprises the step of lifting the tubular structure by lifting the slips device.

In a third aspect the invention relates to the cutting tool in the method in accordance with the invention, wherein the non-rotatable cutting element is configurable to form a sharp cutting edge or a blunter cutting edge depending on the actual need. It was already mentioned that the method of the invention may be carried out with a cutting tool similar to the one in WO2017/099607A1, that is with relatively sharp cutting edges. However, using a blunter cutting edge for the non-rotatable cutting element may be advantageous in the steps of carrying out the squeezing of the tubular structure. Expressed differently, it will be easier to avoid cutting of the tubular structure during the step of squeezing in case (a) blunter cutting edge(s) is/are used. One solution to achieve this is the implementation of a configurable cutting edge that may switch between a sharp cutting edge and a blunt cutting edge and back depending on the actual need. Different technical solutions exist for this. So the cutting tool according to the third aspect of the invention has been improved for carrying out its purpose.

In an embodiment of the cutting tool in accordance with the invention the non-rotatable cutting element is provided with an adapter device to cover the cutting edge of the non-rotatable cutting element in order to form the blunter cutting edge. In a further embodiment this adapter device is pivotable mounted to the cutting element so as to allow easy switching between the sharp cutting edge and the blunter cutting edge.

In a fourth aspect the invention relates to the cutting tool in the method in accordance with the invention, wherein the further cutting element on the reaction member is configurable to form a further sharp cutting edge or a further blunter cutting edge depending on the actual need. Similar to the third aspect it was already mentioned that the method of the invention may be carried out with a cutting tool similar to the one in WO2017/099607A1, that is with relatively sharp cutting edges. However, using a blunter cutting edge for the further cutting element may be advantageous in the steps of carrying out the squeezing of the tubular structure. Expressed differently, it will be easier to avoid cutting of the tubular structure during the step of squeezing in case (a) blunter cutting edge(s) is/are used. One solution to achieve this is the implementation of a configurable cutting edge that may switch between a further sharp cutting edge and a further blunt cutting edge and back depending on the actual need. Different technical solutions exist for this. So the cutting tool according to the fourth aspect of the invention has been improved for carrying out its purpose.

In an embodiment of the cutting tool in accordance with the invention the further cutting element is provided a further adapter device to cover the further sharp cutting edge of the further cutting element in order to form the blunter cutting edge. In a further embodiment this further adapter device is pivotable mounted to the cutting element so as to allow easy switching between the further sharp cutting edge and the further blunter cutting edge.

It must be stressed that the third aspect and the fourth aspect can be combined in that both the cutting element as well as the further cutting element are configurable to form a respective sharp cutting edge or a blunter cutting edge depending on the actual need.

BRIEF INTRODUCTION OF THE DRAWINGS

In the following is described an example of a preferred embodiment illustrated in the accompanying drawings, wherein.

DETAILED DESCRIPTION OF THE EMBODIMENTS

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The figures and description below illustrate embodiments of methods of cutting a tubular structure in the petrochemical industry as well as embodiments of cutting tools, which may be used in such methods.

Figure 1A:
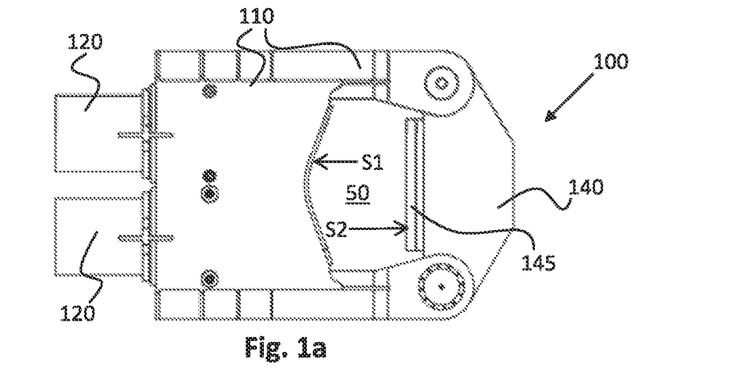
FIG. 1a shows a top view of an embodiment of a cutting tool in accordance with the invention with the non-rotatable cutting element retracted.
Figure 1B:
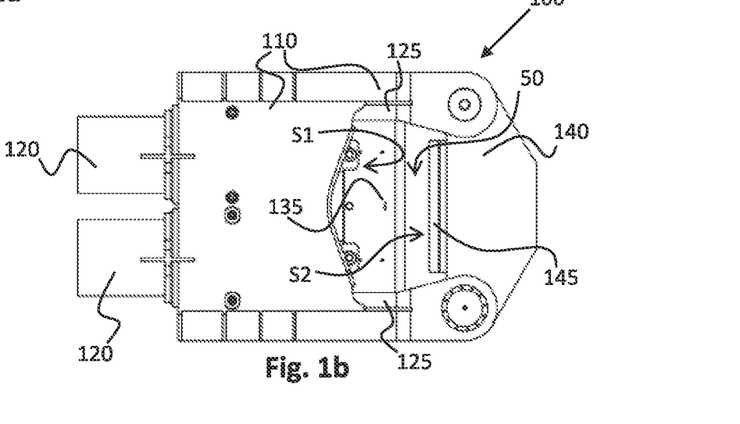
FIG. 1b shows a top view of an embodiment of a cutting tool in accordance with the invention with the non-rotatable cutting element partially extended.

FIG. 1a shows a top view of an embodiment of a cutting tool 100 in accordance with the invention with the non-rotatable cutting element retracted. FIG. 1b shows a top view of an embodiment of a cutting tool 100 in accordance with the invention with the non-rotatable cutting element partially extended. The cutting tool 100 may be installed on the drill floor as a mount onto the roughneck (not shown) or as a stand-alone system (not shown), which may be run back and forth (for instance using a rail system 102) over the Rotary Kelly Bushing (RKB) for each cut. Alternatively, it may be manipulated by means of a crane or manipulator 104. Alternatively, the cutting tool 100 may be used at other places.

FIG. 1a shows a cutting tool 100 with an enclosure 50 for receiving a tubular structure to be cut (not shown). The enclosure 50 is defined by a tool body 110 and a reaction member 140. The cutting tool comprises a linear actuator 120. The linear actuator 120 comprises in this embodiment two hydraulic cylinders, but it may be any other number of hydraulic cylinders or it may be other types of actuators such as jacks. The linear actuator 120 is coupled to a non-rotatable cutting element 130 at first side S1 of the enclosure 50 (shown in FIG. 1b) and configured for carrying out translational cutting movement with said cutting element 135. The reaction member 140 comprises a further cutting element 145 facing the enclosure 50 mounted on a second side S2 opposite to the first side S1, as illustrated. The reaction member 140 in this embodiment is pivotably mounted to the tool body 110 as illustrated. The reaction member 140 may be opened for allowing receiving of the tubular structure in the enclosure 50. In FIG. 1b it is also illustrated that during the extension of the cutting element 135 it is guided on opposing sides by guides 125 in which the cutting element 135 slides. This results in more stable cutting and squeezing.

In the case of a hydraulic actuator 120 it would typically comprise hydraulic cylinder (not shown) with piston (not shown) and a piston rod (not shown) onto which the cutting element 135 is mounted. In operational use the cutting element 135 will come out and, in the current invention, either squeeze or cut the tubular 1 against the cutting element 145 on the reaction member 140, depending on the length of the stroke of the cutting element 145. In fact FIG. 1*b* illustrates a possible stroke that may be applied for squeezing the tubular structure without cutting it. It may be observed that the enclosure 50 is smaller but the cutting element 135 does not touch the further cutting element 145.

The embodiment of the cutting tool of FIGS. 1*a* and 1*b* can cut tubular structures up to 36-inch (914 mm), and is able to squeeze and/or cut drill pipes through the tool joints as well as cemented and lined casings without any problems.

It must be stressed that within the scope of the current claims also other designs and dimensions of the cutting tool are possible, such that the cutting tool is designed for other dimensions of tubular structures. Alternatively, cutting tools may be used which have multiple movable cutting element arranged around the enclosure, i.e. two or four or a different number.

Figures 2A, 2B:
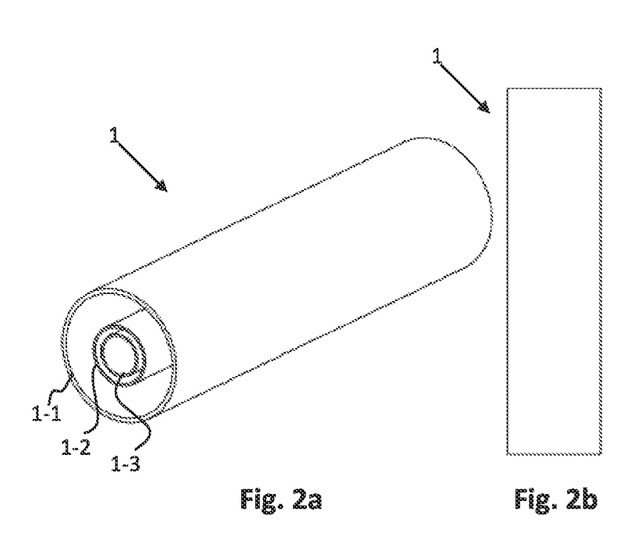
FIGS. 2a-c show a tubular structure comprising a pipe assembly, which may particularly benefit from the invention.
Figure 2C:
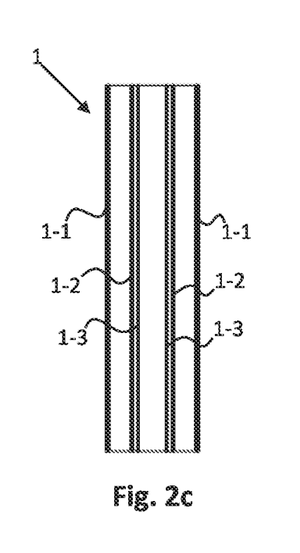

FIGS. 2*a-c* show a tubular structure 1 comprising a pipe assembly, which may particularly benefit from the invention. This tubular structure 1 comprises a plurality of pipes that are concentrically placed over each other. In the current example there is an outer pipe 1-1, which may be a conductor in a practical example (or which may be a riser with multiple internal casings in other examples). Inside the conductor 1-1 there is provided a middle pipe 1-2, which may be a casing in a practical example(or which may be a line casing, a cemented casing, or a cemented lined casing in other examples). Inside the middle pipe 1-2 there is provided an inner pipe 1-3, which may be a production tubing in a practical example (or which may be a drill string, a drill pipe in other examples). Here there are three concentric pipes, but it may also be another number of pipes in practise. In between said concentric pipes there may be cement or other masses.

As already discussed before, a problem may occur when such tubular structures 1 are cut and vertically lifted. In such scenario there is a risk that the inner tubes, including any cement, fall out. In the prior art this problem is typically solved with time-consuming pinning processes.

Figure 3A:
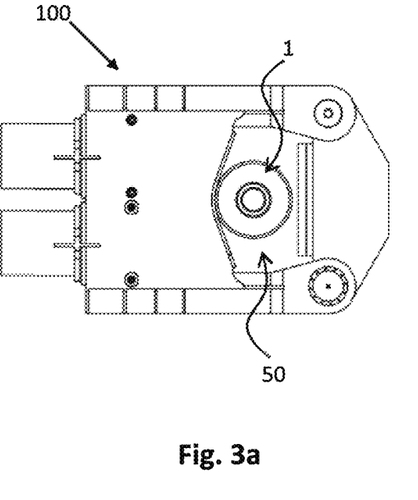
FIGS. 3a-c show a stage of the method of cutting a tubular structure in accordance with the invention.
Figure 3B:
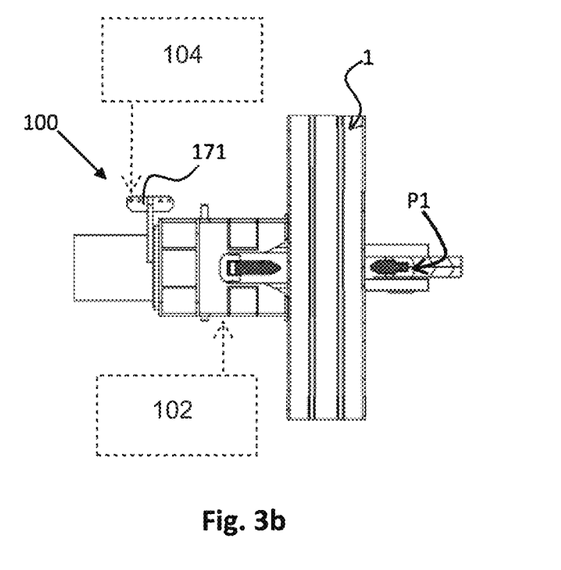
Figure 3C:
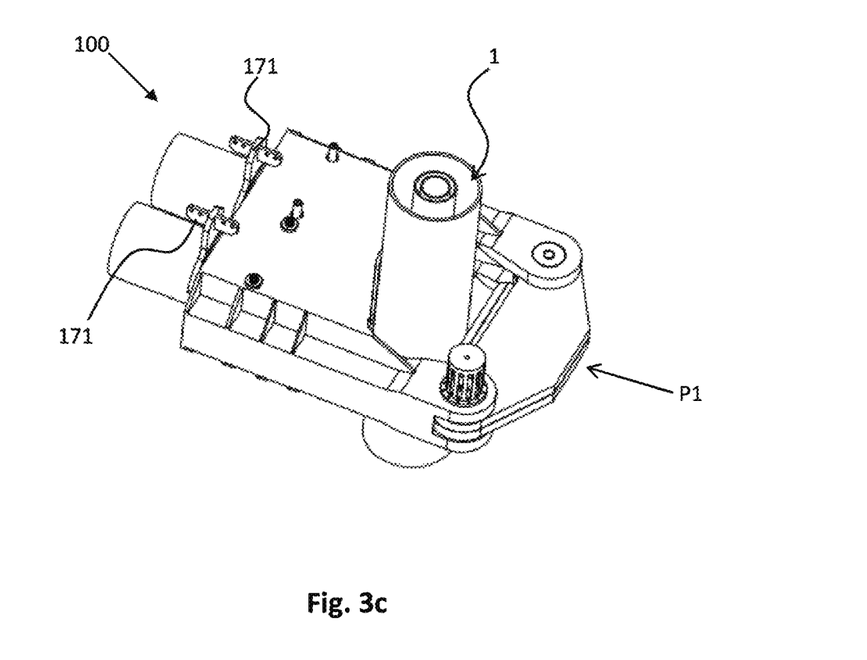

FIGS. 3*a-c* show a stage of the method of cutting a tubular structure 1 in accordance with the invention. FIG. 3*a* shows a top view. FIG. 3*b* shows a cross-sectional side view. FIG. 3*c* shows a perspective view. In this stage of the method the cutting tool 100 is positioned at a first position P1. This means that the reaction member 140 is opened first allowing the tubular structure 1 to be inserted in the enclosure 50 as illustrated. In the current example the cutting tool 100 is further provided with a plurality of hoisting connection points 171, which facilitate handling by means of a crane or other type of manipulator 104.

Figure 4A:
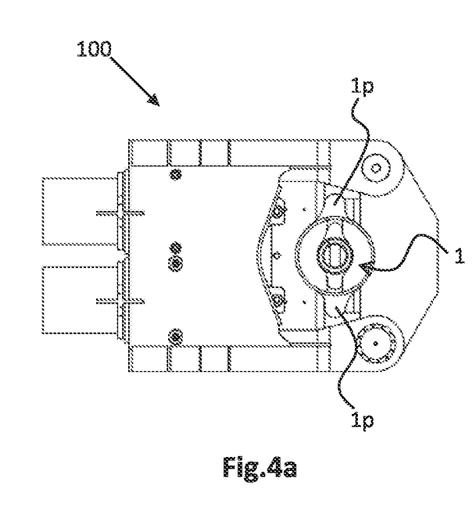
FIGS. 4a-c show a further stage of the method of cutting a tubular structure in accordance with the invention.
Figure 4B:
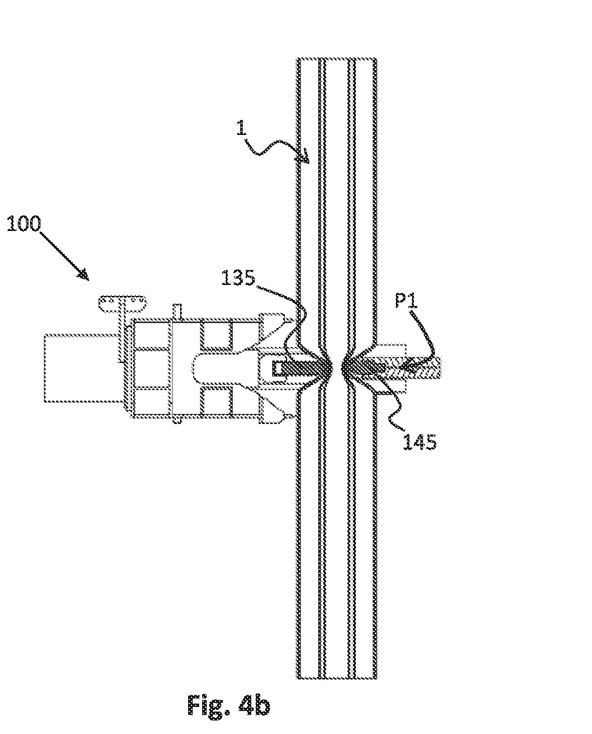
Figure 4C:
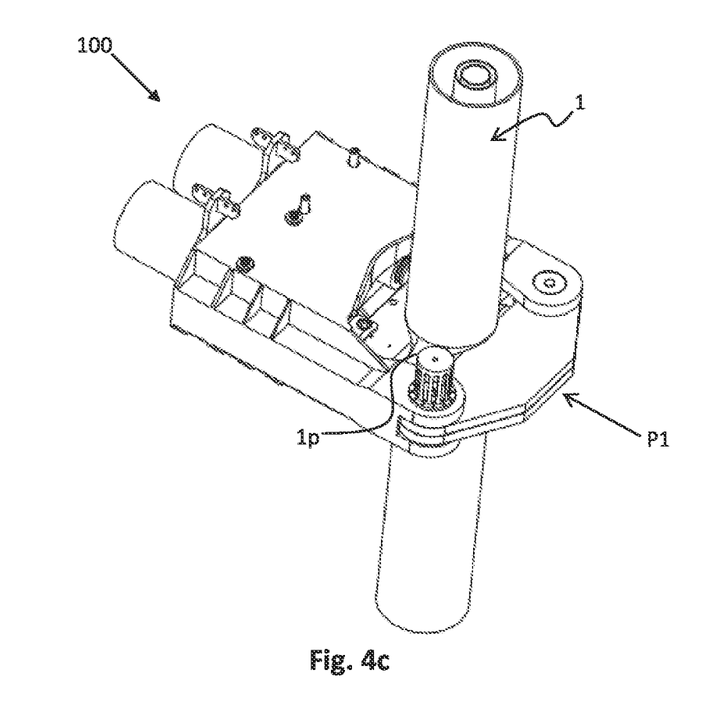

FIGS. 4*a-c* show a further stage of the method of cutting a tubular structure 1 in accordance with the invention. FIG. 4*a* shows a top view. FIG. 4*b* shows a cross-sectional side view. FIG. 4*c* shows a perspective view. In this stage of the method the cutting tool 100 is used to squeeze the tubular structure 1 at the first position P1 as illustrated. Expressed differently, the cutting element 135 is moved/pushed towards the further cutting element 145, but does not fully reach it, which is referred to in the claims as a partial translational cutting movement. During this squeezing step the tubular structure 1 deforms at forms outward projections 1*p* as illustrated in FIG. 4*a* and FIG. 4*c*.

Figure 5A:
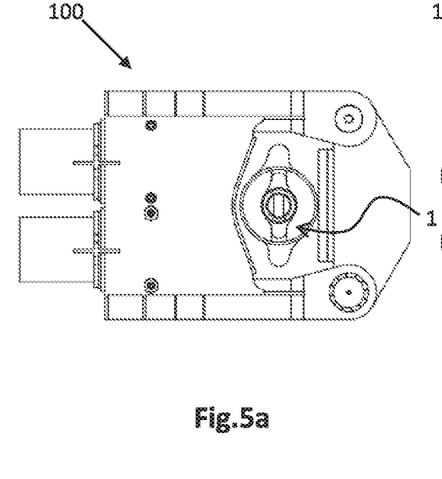
FIGS. 5a-c show a further stage of the method of cutting a tubular structure in accordance with the invention.
Figure 5B:
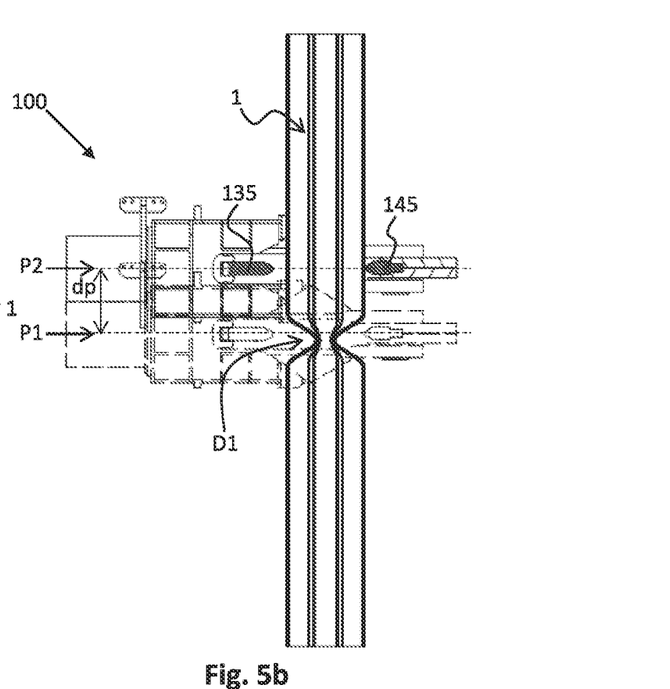
Figure 5C:
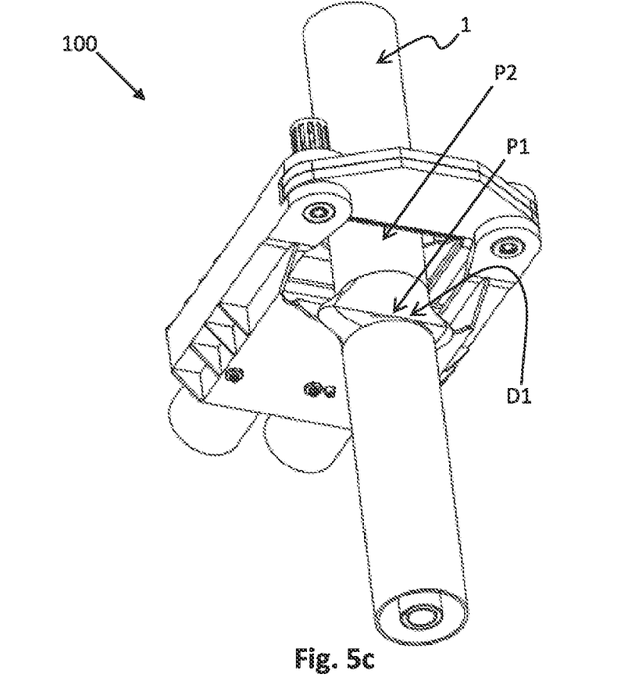

FIGS. 5*a-c* show a further stage of the method of cutting a tubular structure 1 in accordance with the invention. FIG. 5*a* shows a top view. FIG. 5*b* shows a cross-sectional side view. FIG. 5*c* shows a perspective view. In this stage of the method the cutting tool 100 releases the tubular structure 1 and is subsequently moved up to a second position P2 as illustrated, displaced over a predefined distance dp. In a dismantling process of a casing in from a well it is advantageous if the second position P2 is above the first position P1 when the tubular structure 1 is oriented in an upright position. This will be explained later. However, the invention is not limited to this variant of the method. It is important to note that the tubular structure 1 at this stage has a dented region D1 as illustrated.

Figure 6A:
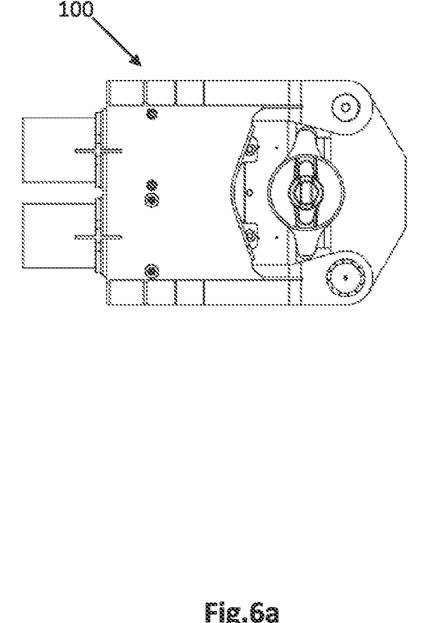
FIGS. 6a-c show a further stage of the method of cutting a tubular structure in accordance with the invention.
Figure 6B:
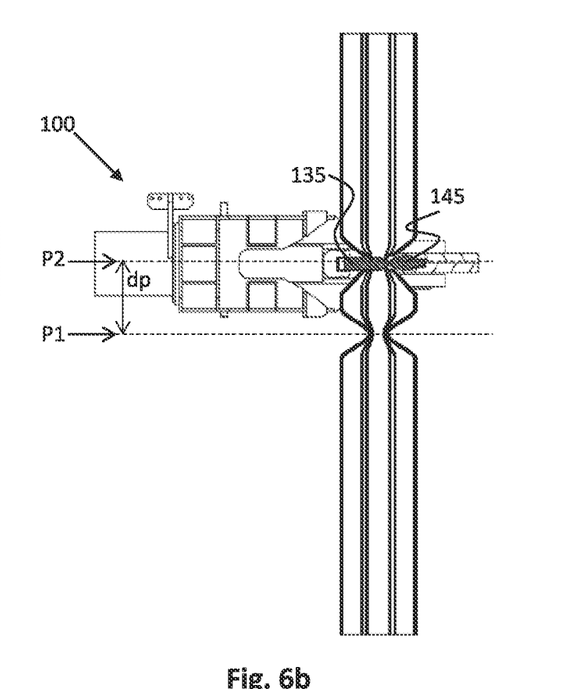
Figure 6C:
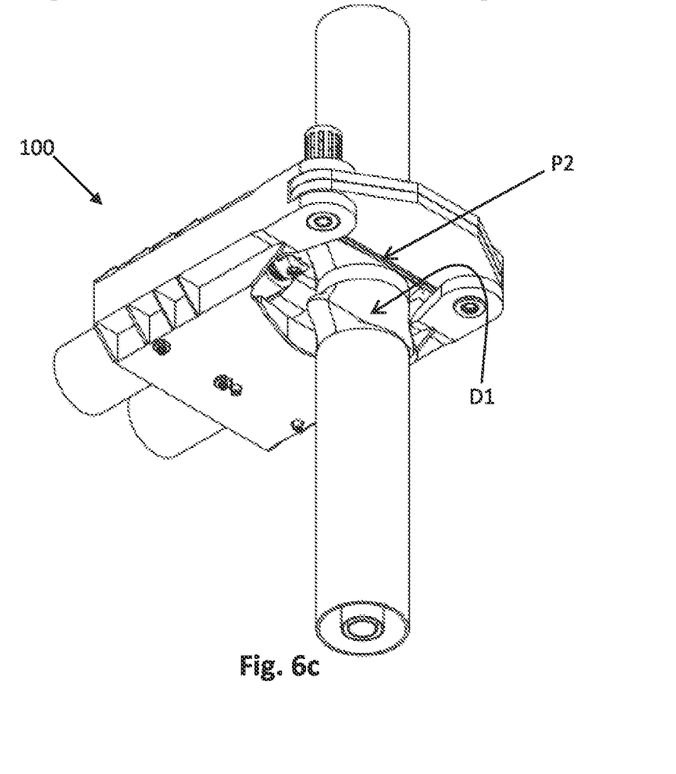

FIGS. 6*a-c* show a further stage of the method of cutting a tubular structure 1 in accordance with the invention. FIG. 6*a* shows a top view. FIG. 6*b* shows a cross-sectional side view. FIG. 6*c* shows a perspective view. In this stage of the method the cutting tool 100 is used to cut the tubular structure 1 at the second location P2 as illustrated. Expressed differently, the cutting element 135 is moved/pushed completely towards the further cutting element 145, and touches it, which is referred to in the claims as a full translational cutting movement.

Figure 7:
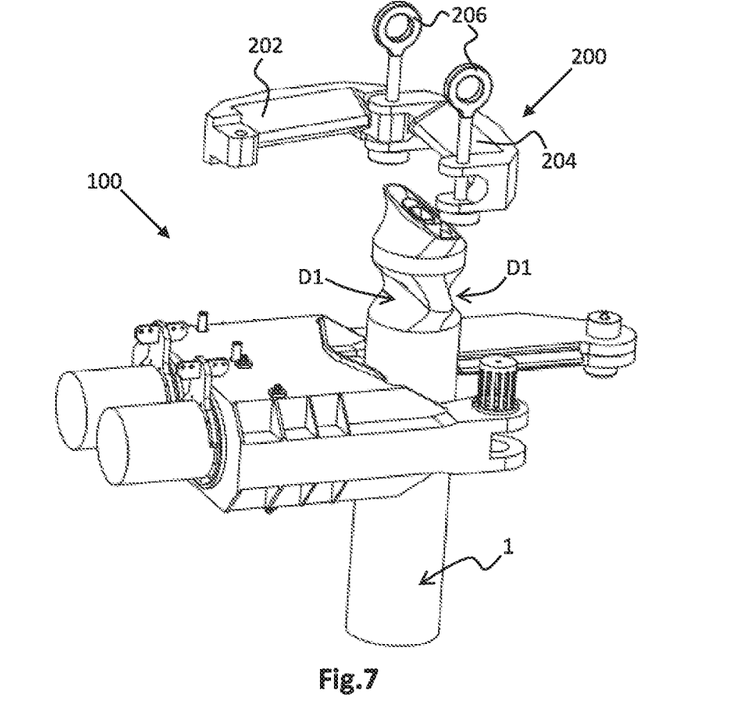
FIG. 7 shows a stage of a method of handling a tubular structure in accordance with the invention.

FIG. 7 shows a stage of a method of handling a tubular structure 1 in accordance with the invention. In fact this method follows on the method illustrated in FIGS. 3*a*-6*c*. The dented region D1 is now clearly visible at the upper section of the remaining tubular structure 1. Now, the tubular structure 1 may be further handled by a slips device 200 as illustrated. The slips device 200 comprises a first part 202 pivotably mounted to a second part 204 as illustrated so as to form a further enclosure that is designed to match the form of the dented region D1. In FIG. 7 the slips device 200 is opened as illustrated so that the tubular structure 1 may be received inside its enclosure.

Figure 8:
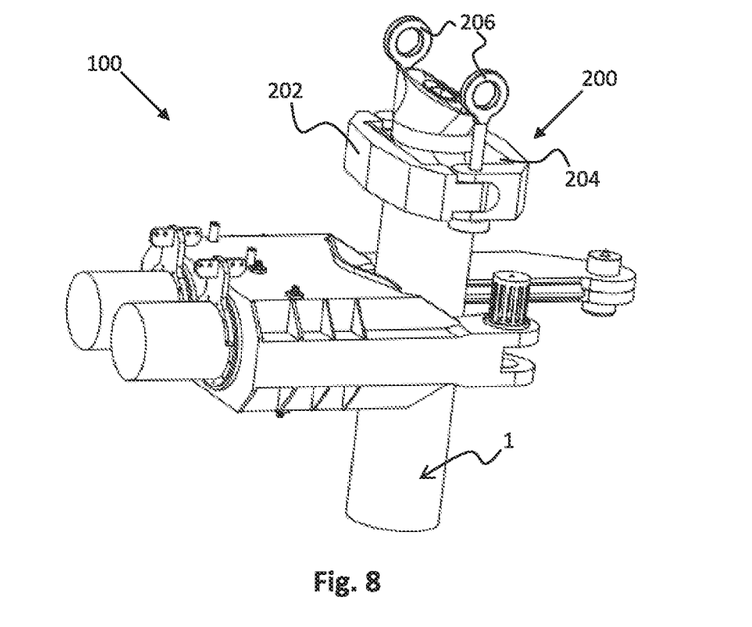
FIG. 8 shows a further stage of the method of handling a tubular structure in accordance with the invention.

FIG. 8 shows a further stage of the method of handling a tubular structure 1 in accordance with the invention. In this stage the slips device 200 is provided around the dented region D1 and closed. The slips device 200 in FIGS. 7 and 8 also comprises respective lifting hooks 206 as illustrated, which allow the slips device 200 to be handled by a hoisting device, crane or manipulator (such as crane or manipulator 104). In the stage of FIG. 8 the tubular structure 1 possible with a large string of tubular structures underneath may be lifted up in order to allow cutting of the tubular structure 1 at a further position below the first position. In this way the tubular structure 1 may be severed piece by piece by sequentially squeezing, cutting and lifting said tubular structure.

Figure 9A:
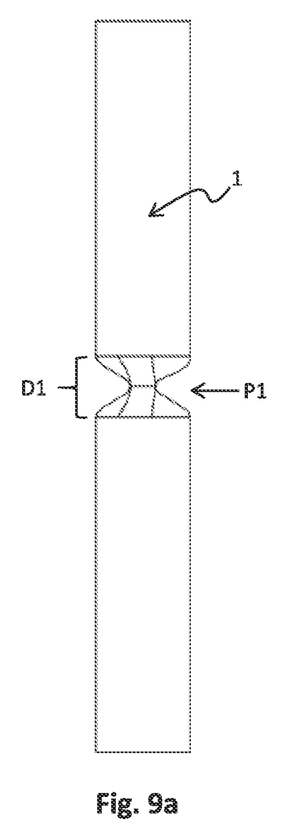
FIGS. 9a-b illustrate a first aspect of the invention.
Figure 9B:
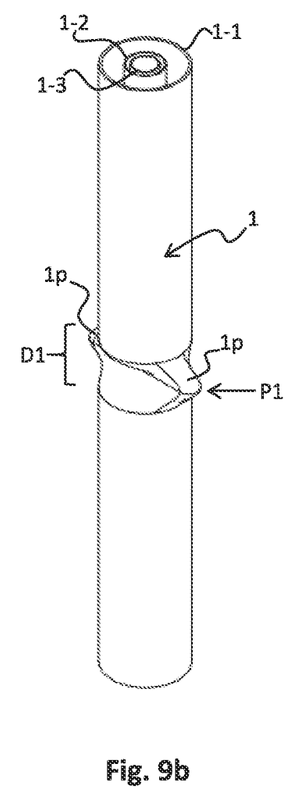

FIGS. 9*a-b* illustrate a first aspect of the invention. These figures illustrate what is meant with the earlier discussed dented region D1 of the tubular structure 1 at the first position P1. The outward projections 1*p* are also clearly illustrated.

Figure 10A:
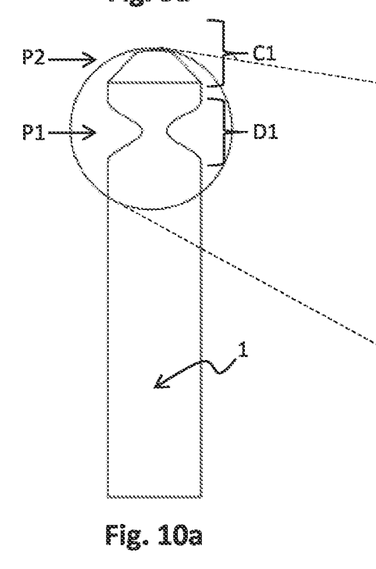
FIGS. 10a-b illustrate another aspect of the invention.
Figure 10B:
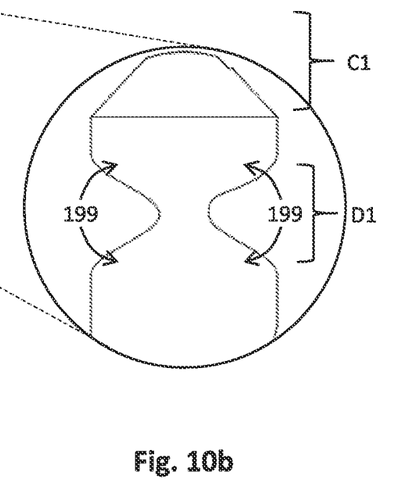

FIGS. 10*a-b* illustrate another aspect of the invention. These figures illustrate what is meant with the so-called shoulders 199 formed in the dented region D1 as mentioned in the claim. Each dent on each side clearly causes two shoulders 199 opposite to each other as illustrated in FIG. 10*b*. These shoulders 199 form the parts that is gripped in between by the earlier-discussed slips device 200. FIGS. 10*a* and 10*b* also illustrate the cutting region C1 that is located at the earlier-discussed second position P2. At this cutting region C1 the tubular structure 1 is squeezed completely together to get a form similar to these figures.

Figure 11A:
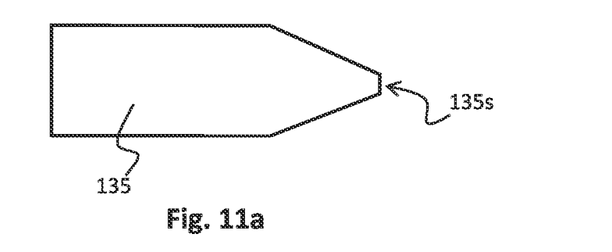
FIGS. 11a-b illustrate part of an embodiment of the cutting tool in accordance with the invention.
Figure 11B:
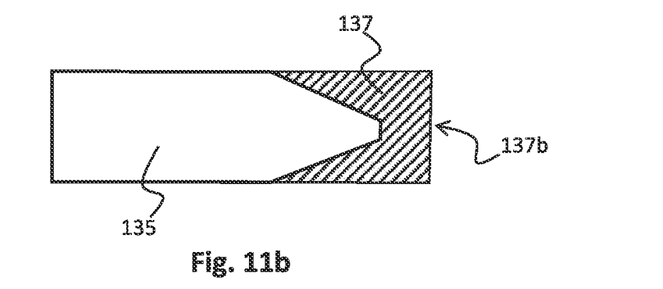

FIGS. 11*a-b* illustrate part of an embodiment of the cutting tool in accordance with the invention. The illustrated part is the non-rotatable cutting element 135, which in FIG. 11*a* has a sharp cutting 135*s*. It has already been mentioned that in principle the cutting tool as disclosed in or similar to the one in WO2017/099607A1 may be used, i.e. a cutting tool with sharp cutting edges. However, the cutting tool in accordance with the current invention may be improved by implementing an adapter 137 as illustrated in FIG. 11b. This adapter 137 is shaped to cover the sharp cutting edge 135s and effectively forms a blunter cutting edge 137b for the cutting element 135. The level of sharpness and the level of bluntness in FIGS. 11a and 11b may vary. It may even be arbitrary what the definition of "sharp" is in this respect. What is important is that there is at least different levels of sharpness or bluntness for the cutting element 135. The adapter 137 may be provided manually on the cutting element 135 or it may be pivotably mounted to the cutting element 135. The use of the adapter 137 turns the cutting element 135 into a configurable cutting element, wherein the cutting edge may be sharp or blunter depending on the requirements of the stage of the method of the invention.

Figure 12A:
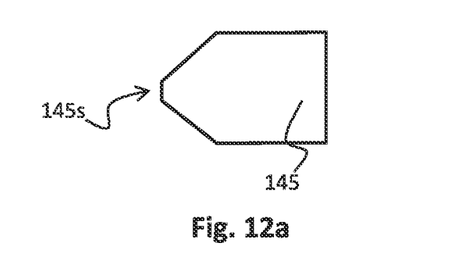
FIGS. 12a-b illustrate another part of an embodiment of the cutting tool in accordance with the invention.
Figure 12B:
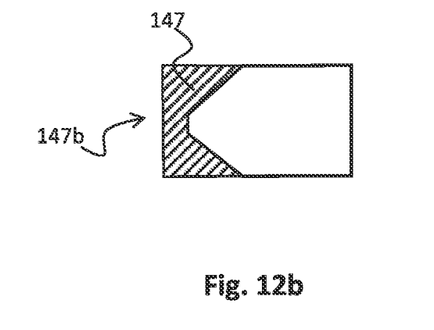

FIGS. 12a-b illustrate another part of an embodiment of the cutting tool in accordance with the invention. The illustrated part is the further cutting element 145, which in FIG. 12a has a further sharp cutting 145s. The cutting tool in accordance with the current invention may be improved by implementing a further adapter 147 as illustrated in FIG. 12b. This further adapter 147 is shaped to cover the further sharp cutting edge 145s and effectively forms a blunter cutting edge 147b for the further cutting element 145. The level of sharpness and the level of bluntness in FIGS. 12a and 12b may vary. The definition of "sharp" may be even arbitrary in this respect. What is important is that there are at least different levels of sharpness or bluntness for the further cutting element 145. The further adapter 147 may be provided manually on the further cutting element 145 or it may be pivotably mounted to the further cutting element 145. The use of the further adapter 147 turns the further cutting element 145 into a configurable cutting element, wherein the cutting edge may be sharp or blunter depending on the requirements of the stage of the method of the invention.

With reference to FIGS. 11b and 12b it must be noted that these aspects may be conveniently combined such that both cutting edges are configurable in terms of sharpness or bluntness.

The particular embodiments disclosed above are illustrative only, as the invention may be modified and practiced in different yet equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. In the device claims enumerating several means, several of these means may be embodied by one and the same item of hardware.

The invention claimed is:

1. A method for cutting a tubular structure in a petrochemical industry, using a cutting tool having a non-rotatable cutting element and a reaction member opposite to the non-rotatable cutting element, the cutting tool being configured for carrying out a translational cutting movement through the tubular structure,
wherein the method comprises:
a) positioning the cutting tool in a first position exterior to the tubular structure;
b) squeezing the tubular structure at the first position by activating a partial translational cutting movement of the non-rotatable cutting element to obtain a dented region in the tubular structure;
c) retracting the non-rotatable cutting element subsequent to the step of squeezing;
d) positioning the cutting tool in a second position exterior to the tubular structure, wherein the second position is displaced over a predefined distance compared to the first position, and
e) cutting the tubular structure at the second position by activating a full translational cutting movement of the non-rotatable cutting element through the tubular structure.

2. The method according to claim 1, wherein, in operational use of the method, the tubular structure is oriented in an upright position, and wherein the second position is located above the first position.

3. The method according to claim 1, further comprising moving the cutting tool to and from the tubular structure using a crane or manipulator.

4. The method according to claim 1, further comprising moving the cutting tool to and from the tubular structure using a rail system.

5. The method according to claim 1, wherein the tubular structure in the petrochemical industry to be cut is selected from a group consisting of: a conductor, a casing, a cemented casing, a lined casing, a cemented lined casing, a drill string, a drill pipe, a production tubing, and a riser.

6. The method according to claim 1, wherein the cutting tool comprises:
a tool body configured for receiving the tubular structure in an enclosure thereof;
an actuator mounted on the tool body at one side of the enclosure;
the non-rotatable cutting element provided on the actuator, the actuator with the non-rotatable cutting element being configured for carrying out translational cutting movements through the enclosure including the tubular structure; and
the reaction member mounted at an opposite side of the enclosure of the tool body opposite to the non-rotatable cutting element for applying a reaction force on the tubular structure during cutting,
wherein, in the steps of positioning, the tubular structure is received within the enclosure, and in the steps of squeezing and cutting, a position of the reaction member is maintained with respect to the enclosure.

7. The method according to claim 6, wherein in the cutting tool that is used, the reaction member is provided with a further cutting element having a cutting edge facing towards the non-rotatable cutting element for facilitating the cutting, wherein a position of the further cutting element is maintained with respect to the enclosure during the partial translational cutting movement and during the full translational cutting movement.

8. The method according to claim 1, further comprising gripping the dented region of the tubular structure with a slips device configured for gripping in between shoulders of the dented region.

9. The method according to claim 8, further comprising the step of lifting the tubular structure by lifting the slips device.

10. The method of claim 1, wherein the first position is proximate to a drill floor of a petrochemical drilling rig.

11. The method of claim 1, wherein the tubular structure comprises a plurality of concentric pipes.

12. The method of claim 1, wherein the dented region has a first dent on a first side of the tubular structure facing towards the non-rotatable cutting element, and a second dent on a second side of the tubular structure facing towards the reaction member and opposite to the first side.

13. The method of claim 1, wherein the tubular structure includes a portion having a round cross-section between the first position and the second position subsequent to the step of cutting.

14. The method of claim 1, wherein the tubular structure has a first diameter at the first position prior to the step of squeezing, and the dented region has a first dimension and a second dimension subsequent to the step of squeezing, wherein the first dimension is less than the first diameter and the second dimension is greater than the first diameter such that the dented region forms outward projections that extend beyond the tubular structure.

15. The method of claim 1, further comprising:
f) positioning the cutting tool in a third position exterior to the tubular structure, wherein the third position is displaced more than the predefined distance compared to the second position, such that a portion of the tubular structure between the second position and the third position is left substantially intact;
g) squeezing the tubular structure at the third position by activating the partial translational cutting movement of the non-rotatable cutting element to obtain a second dented region in the tubular structure;
h) retracting the non-rotatable cutting element subsequent to the step of squeezing at the third position;
i) positioning the cutting tool in a fourth position exterior to the tubular structure, wherein the fourth position is displaced over the predefined distance compared to the third position; and
j) cutting the tubular structure at the fourth position by activating the full translational cutting movement of the non-rotatable cutting element through the tubular structure.

* * * * *